United States Patent
Adams et al.

(10) Patent No.: US 6,336,946 B1
(45) Date of Patent: Jan. 8, 2002

(54) SHIFT PLEAT AIR FILTER

(75) Inventors: Michael David Adams, Bessemer; David William Ager, Gastonia; Gregory Keith Rhyne, Denver, all of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 08/391,668

(22) Filed: Feb. 21, 1995

(51) Int. Cl.$^7$ .................. B01D 46/00; B01D 39/00; B01D 50/00; B01D 59/50
(52) U.S. Cl. ............... 55/385.3; 55/497; 55/521; 96/421
(58) Field of Search ............... 55/385.3, 521, 55/497; 96/421

(56) References Cited

U.S. PATENT DOCUMENTS

| | | | |
|---|---|---|---|
| 3,022,861 A | 2/1962 | Harms | 210/493.1 X |
| 3,261,147 A * | 7/1966 | Allander | 55/521 X |
| 3,266,223 A | 8/1966 | Dresser et al. | 210/493.1 X |
| 3,411,272 A * | 11/1968 | Carmon | 55/521 X |
| 3,696,592 A * | 10/1972 | Engleman | 55/521 X |
| 3,744,216 A * | 7/1973 | Halloran | 55/521 X |
| 4,200,444 A * | 4/1980 | Witchell | 55/521 X |
| 4,552,657 A | 11/1985 | Ogawa et al. | 210/169 |
| 4,692,177 A * | 9/1987 | Wright et al. | 55/521 X |
| 5,128,039 A * | 7/1992 | Gabrielson | 55/521 X |
| 5,302,354 A | 4/1994 | Watvedt et al. | 422/177 |
| 5,320,657 A | 6/1994 | Adams | 55/463 |

* cited by examiner

Primary Examiner—Marian C. Knode
Assistant Examiner—Alexa A. Doroshenk
(74) Attorney, Agent, or Firm—Millen, White, Zelano & Branigan, P.C.

(57) ABSTRACT

A panel-type filter employs a rectangular filter element having shifted pleats wherein the peaks of the pleats on the upstream and downstream sides of the filter medium alternate between high and low peaks. By so configuring the filter medium, turbulence is decreased at the upstream side of the filter which reduces restriction. The reduced restriction increases air flow to the engine which results in reduced fuel consumption and higher engine output power. Moreover, compression and turbulence is reduced at the downstream side of the filter resulting in flow past sensors to the engine which is more laminar, thus increasing the effectiveness of the sensors.

11 Claims, 2 Drawing Sheets

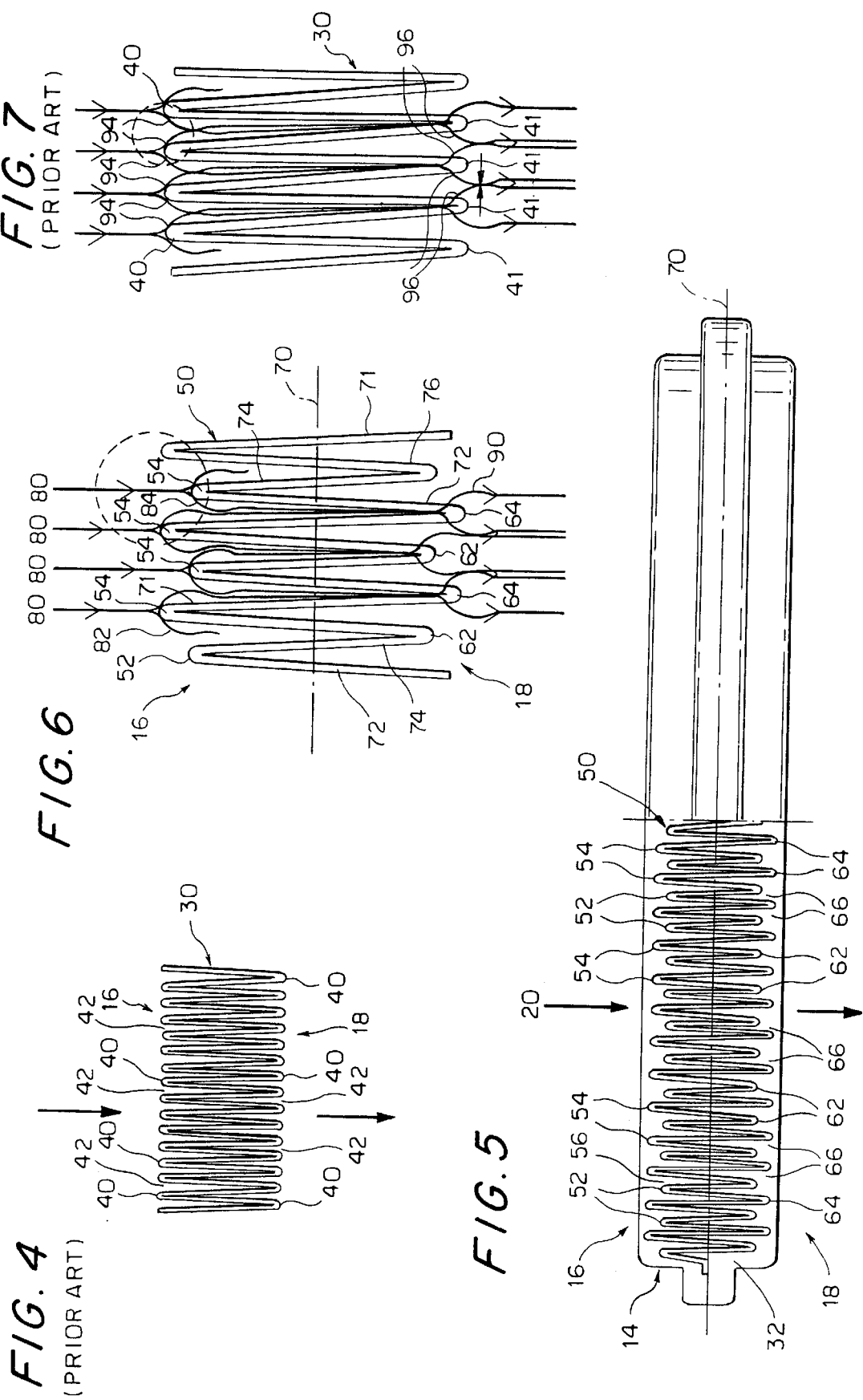

SHIFT PLEAT AIR FILTER

FIELD OF THE INVENTION

The present invention is directed to air filter configurations and, more particularly, air filters with pleats of different heights.

BACKGROUND OF THE INVENTION

Air filters are well known devices in which an airstream is drawn or forced into a housing and caused to pass through a filter medium configured to remove dirt, dust and other particles entrained in the airstream. The airstream cleaned by the filter is thereafter used in devices such as internal combustion engines.

The filter element is disposed in a filter retainer or housing between an air inlet and air outlet. Generally, a seal is positioned to seal the air inlet from the air outlet so that all air passing out of the outlet has been passed through the filter element. For most automotive applications, the filter element is conventionally constructed of pleated paper with pleats facing upstream toward the airstream inlet and downstream toward the airstream outlet. These filters may be of the cylindrical, frustoconical or panel configuration. Many light duty air filters used in automotive applications to filter inlet air for internal combustion engines are configured as rectangular panels to filter the high velocity air consumed by the engines.

Heretofore, high velocity, panel-type air filters configured of pleated media filter elements have pleats of the same length. In other words, the pleat-to-pleat distance from the folds of each pleat are substantially the same for all pleats.

Where the filter paper medium is pleated with each pleat having the same length or amplitude, restriction of air flow through the filter is increased by creating turbulent air flow at the upstream side of the filter. This results in increased fuel consumption and reduced engine power.

SUMMARY OF THE INVENTION

In view of the aforementioned considerations, it is a feature of the present invention to provide a new and improved air filter which lowers restriction across the filter without reducing the filter's capacity or efficiency to thereby provide an air filter for devices such as internal combustion engines which allows the air fed to the engines to be filtered so that the engines operate with reduced fuel consumption and increased power.

In accordance with one aspect of the invention, a configuration for an air filter element is provided wherein the air filter element is comprised of a web of filter material folded with a plurality of pleats. The air filter material has an upstream side facing toward an incoming airstream and a downstream side facing away from the incoming airstream. The web is configured of high peaks and low peaks on both the upstream side of the filter and the downstream side of the filter with the high and low peaks alternating with one another.

It is further contemplated that the filter material can be one of many types of filtering media and that the web is comprised of panels of different widths joined by folds and separated by V-shaped gaps in a series comprising wide panels, first intermediate width panels, relatively narrow width panels and second intermediate width panels, which series repeats itself in the air filter element.

A further aspect of the present invention is directed to the aforementioned structure in combination with an air intake of an internal combustion engine, whereby the aforementioned structure reduces restriction of air flow across the filter by decreasing turbulence as the airstream enters the upstream side of the filter, thereby enhancing the capacity and efficiency of the filter while providing more consistent air density on the downstream side of the filter.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 4 is a side elevation taken along lines 4—4 of FIG. 2 showing a prior art configuration for pleats used in a panel-type filter such as the filter of FIG. 2;

FIG. 5 is a side elevation taken along lines 5—5 of FIG. 2 showing a pleat configuration in accordance with the present invention utilized with the panel-type filter element of FIG. 2;

FIG. 6 is an enlarged portion of the pleat assembly configured in accordance with the present invention showing air flow therethrough; and FIG. 7 is an enlarged portion of the prior art pleat assembly of FIG. 4 showing air flow therethrough.

DETAILED DESCRIPTION

Figure 1:
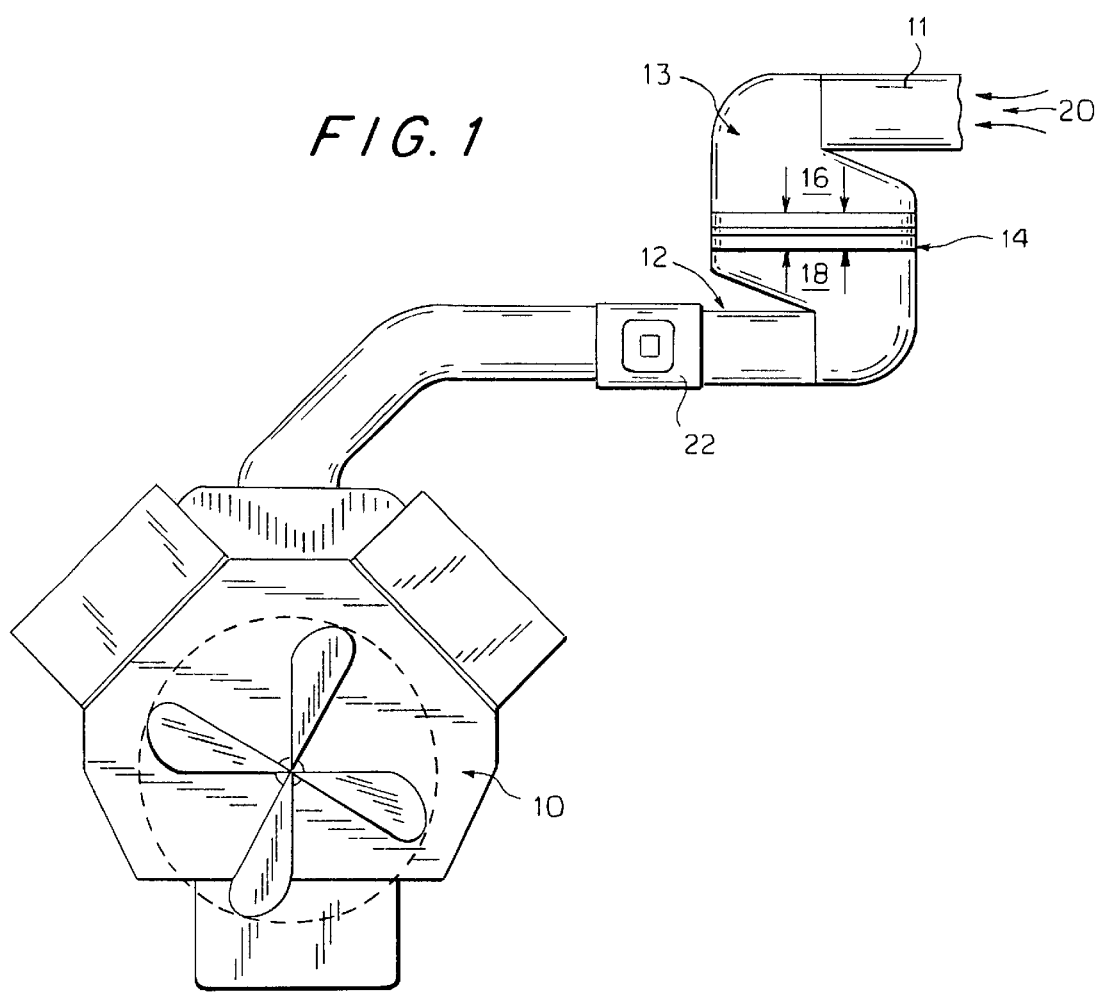
FIG. 1 is a substantially schematic view showing an air filters mounted in an air intake of an internal combustion engine.

Referring now to FIG. 1, there is shown an internal combustion engine 10 which receives air through an inlet 11 of an air intake 12. Positioned in the air intake 12 is a filter housing 13 retaining panel-type filter 14 which has an upstream side 16 and a downstream side 18. A high speed stream of air 20 enters the inlet 11, passes through the upstream side 16 of the filter 14 and emerges through the downstream side 18 of the filter element before passing to the engine. In accordance with present practices, a sensor 22 is disposed in the air inlet 12 for sensing temperature and pressure. In accordance with conventional practice, the signals from the sensor 22 are used to adjust various parameters in the engine 10.

It is important to keep restriction across the filter 14 as low as possible without reducing the capacity or efficiency of the filter element. When this is accomplished, the engine 10 has reduced fuel consumption and higher power output. In addition, if the sensor 22 is monitoring the airstream emerging from the filter 14, it is beneficial to have an airstream which is as laminar as possible so that constant measurement of air density is enhanced which also leads to reduced fuel consumption and increased engine power.

Figure 2:
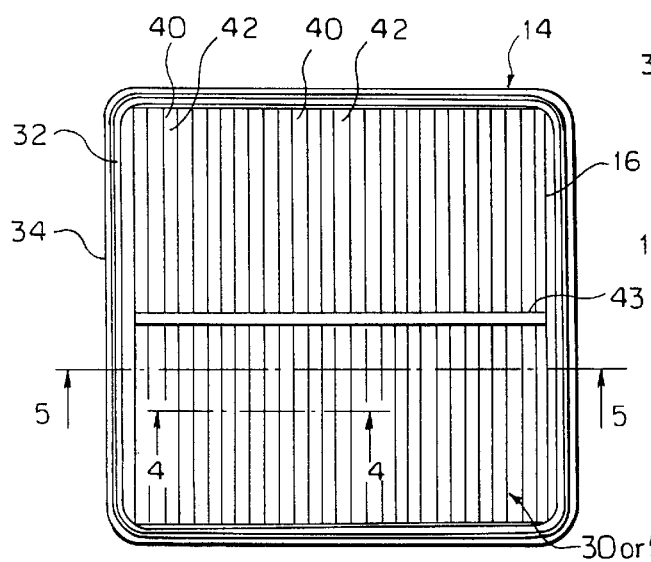
FIG. 2 is a front view of the type of filter employed in FIG. 1.
Figure 3:
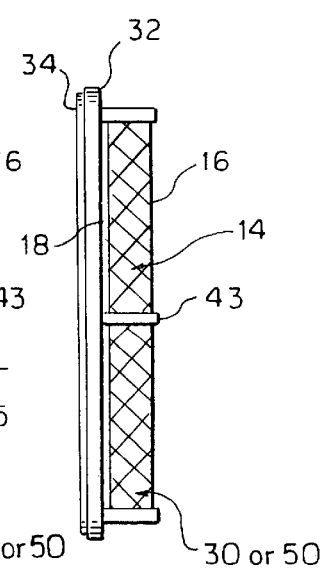
FIG. 3 is a side view of the filter of FIGS. 1 and 2.

Referring now to FIGS. 2 and 3, it is seen that the air filter element 14 is rectangular in shape and includes a prior art filter medium 30 (or novel filter medium 50) supported in a frame 32 which has a sealing gasket 34 which seals with flange structure in the air intake 12 in a conventional manner. In the prior art arrangement, the filter material 30 is comprised of filter media and is arranged with pleats 40 which have spaces 42 therebetween. Preferably, the filter medium 30 is reinforced by a central rib 43.

Referring now to FIG. 4, it is seen that with prior art pleats, each of the pleats 40 have the same height. With the prior art arrangement of FIG. 4, the pleated filter medium 30 provides more filter area than a flat sheet of filter medium would provide. While this increases the amount of particulate contaminant that the filter medium 30 can hold; the filter medium pleated in the manner of FIG. 4, increases restriction of air flow through the filter medium 30 due to the creation of turbulent air flow at the front or upstream side 16 of the filter and generates turbulence at the back or downstream side 18 of the filter.

Referring now to FIG. 5, the prior art filter medium 30 has been reconfigured as a filter medium 50 having "shifted pleats". On the front or upstream side 16 of the filter medium 50, there are relatively low peaks 52 and relatively high peaks 54 separated by V-shaped spaces 56. On the back or downstream side 18 of the filter medium 50, there are low peaks 62 and high peaks 64 separated by V-shaped spaces 66. With respect to a center line 70, the upstream and downstream sides 16 and 18 of the filter 50 are mirror images of one another. The high peaks 54 lay in the same plane on the upstream side 16 of the filter medium 50 and the high peaks 64 lay in the same plane on the downstream side 18 of the filter medium. The low peaks 52 lay in the same plane on the upstream side 16 of the filter medium 50, and the low peaks 62 lay in the same plane on the downstream side 18 of the filter medium.

Referring now to FIG. 6, where a portion of the pleated medium 50 is shown enlarged, it is seen that between the high peaks 64 and 54, there is a relatively wide web 71 of pleat material and between the relatively high peak 64 and relatively low peak 52 there is a web 72 of a first intermediate width. Between the relatively low peak 52 and relatively low peak 62, there is a relatively narrow width web 74 and between the next low peak 62 and high peak 54, there is a second web of intermediate width 72. In the direction of centerline 70, this pattern repeats itself over the length of the filter medium 50. The center line 70 lies in a central plane extending perpendicular to the direction of the inlet airstream 80 and perpendicular to the plane of the drawing of FIG. 6.

As is seen in FIGS. 5 and 6, each of the high peaks 54 and 64 is disposed between two low peaks 52 and 62 and each of the low peaks 52 and 62 is disposed between two high peaks 54 and 64 so that high and low peaks always alternate with one another on both the upstream and downstream sides of the filter 14.

By arranging the pleats in accordance with the configuration of FIGS. 5 and 6, the amount of turbulence at the upstream side of the filter medium 50, is decreased as the airstream 20 hits the upstream side 16 the filter medium which decreases restriction at the filter medium as compared to the prior art filter medium 30 of FIG. 4. This is evident upon comparing FIGS. 6 and 7. As is seen in FIG. 6, when a stream 80 of high speed air encounters one of the high peaks 54, it is deflected on both sides of the peak creating a bulge 82. Likewise, when the stream of high speed air encounters one of the low peaks 52, it is deflected to both sides of the peak creating a bulge 84. Since the bulges 82 and 84 are stepped or sifted in the direction of the stream, the bulges do not conflict and compress against one another. This reduces turbulence and restriction. The resulting reduced restriction increases engine power and reduces gas mileage while possibly having the additional advantage of increasing the capacity and life of the filter medium 50.

On the downstream side 18 of the filter medium air density is more consistent and air flow more laminar through the air intake 12, thus enhancing the effectiveness of the sensor 22. As is apparent from FIG. 6, the airstream emerging from the filter medium 50 of the filter 14 spreads proximate peaks 62 in bulges 90 and proximate peaks 62 in bulges 92. Since the bulges 90 and 92 are displaced from one another in the direction of flow, interference and compression are reduced resulting in more laminar flow.

The difference made by arrangement of FIGS. 5 and 6 is apparent upon considering the prior art configuration of filter medium 30 shown in FIG. 7. In FIG. 7, the peaks 40 and 41 are each at the same level resulting in upstream and downstream bulges 94 and 96, respectively, which interfere with one another causing compression and turbulence at the upstream side 16 of the filter medium 30, as well as compression and turbulence 96 at the downstream side 18.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A configuration for an air filter wherein the air filter has an air filter element with a web of filter material folded into a plurality of pleats, extending laterally from a center plane, the air filter element having an upstream side facing toward an incoming airstream and a downstream side facing away from the incoming airstream, the pleats leaving folds forming peaks of different heights with respect to the center plane of the pleats, the improvement comprising:

the pleats consisting of relatively high peaks with respect to the center plane and relatively low peaks with respect to the center plane, the high and low peaks being on both the upstream side of the filter element and the downstream side of the filter element, with the high peaks and low peaks alternating with one another so that each high peak is between two low peaks and each low peak is between two high peaks.

2. The improvement of claim 1, wherein the filter material is filter paper.

3. The improvement of claim 1, wherein the web is comprised of panels of different widths joined by folds and separated by V-shaped gaps, the panels comprising in series a wide width panel, a first intermediate width panel, a narrow width panel and a second intermediate width panel, the second intermediate width panel being equal in width to the first intermediate width panel, but being offset with respect to the sides of the filter from the first intermediate panel, the series repeating across the filter and the wide, intermediate and narrow widths being wide, intermediate and narrow with respect to one another.

4. The improvement of claim 3, wherein the high peaks on each side of the filter lay in substantially the same planes and the low peaks on each side of the filter lay in substantially the same planes with the planes being parallel to one another and to the center plane to form a filter configured as a panel.

5. The improvement of claim 4, wherein the panel is rectangular.

6. In combination with an air intake for an internal combustion engine, a configuration for an air filter, wherein the air filter includes a filter element having a filter media of filter material folded with a plurality of pleats extending laterally from a center plane, the air filter having an upstream side facing toward an incoming airstream and a downstream side facing away from the incoming airstream, the pleats having folds forming peaks of different heights with respect to the center plane of the pleats, the improvement comprising:

the pleats consisting of relatively high peaks with respect to the center plane and relatively low peaks with respect to the center plane on both the upstream side of the filter element and the downstream side of the filter element with the high and low peaks alternating with one another so that each high peak is between two low peaks and each low peak is between two high peaks, whereby restriction of air flow across the filter is reduced due to decreased turbulence as the airstream enters the upstream side of the filter.

7. The improvement of claim 6, wherein the filter material is filter paper.

8. The improvement of claim 6, wherein the high peaks on each side of the filter lay in substantially the same planes and the low peaks on each side of the filter element in substantially the same planes with the planes being parallel to one another and to the central plane.

9. The improvement of claim 6, wherein the filter element is rectangular.

10. The improvement of claim 6, wherein the filter element is rectangular and wherein the high peaks on each side of the filter element lay in substantially the same planes and wherein the low peaks on each side of the filter element lay in substantially the same planes with the planes being parallel to one another and the central plane.

11. The improvement of claim 10, wherein the combination further includes a sensor in the air intake downstream of the filter element for sensing at least air pressure.

* * * * *